United States Patent
Kiribuchi

(10) Patent No.: US 12,381,423 B2
(45) Date of Patent: Aug. 5, 2025

(54) POWER SUPPLY SYSTEM, POWER SUPPLY SYSTEM CONTROL METHOD, AND PROGRAM

(71) Applicant: OMRON Corporation, Kyoto (JP)

(72) Inventor: Takeshi Kiribuchi, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 89 days.

(21) Appl. No.: 18/548,478

(22) PCT Filed: Dec. 20, 2021

(86) PCT No.: PCT/JP2021/047109
§ 371 (c)(1),
(2) Date: Aug. 30, 2023

(87) PCT Pub. No.: WO2022/196006
PCT Pub. Date: Sep. 22, 2022

(65) Prior Publication Data
US 2024/0136865 A1    Apr. 25, 2024
US 2024/0235279 A9    Jul. 11, 2024

(30) Foreign Application Priority Data

Mar. 15, 2021  (JP) .................................. 2021-041810
Dec. 8, 2021  (JP) .................................. 2021-199553

(51) Int. Cl.
*H02J 50/80*    (2016.01)
*H02J 50/40*    (2016.01)
(Continued)

(52) U.S. Cl.
CPC .............. *H02J 50/80* (2016.02); *H02J 50/40* (2016.02); *H02J 50/10* (2016.02); *H02J 50/20* (2016.02); *H02J 50/30* (2016.02)

(58) Field of Classification Search
CPC .. H02J 50/80; H02J 50/40; H02J 50/10; H02J 50/20; H02J 50/30; H02J 50/005
See application file for complete search history.

(56) References Cited

U.S. PATENT DOCUMENTS 10,199,880 B2 *  2/2019  Takahashi ............. H02J 50/402
2014/0354194 A1  12/2014  Toba et al.
(Continued)

FOREIGN PATENT DOCUMENTS

JP    H05184195 A    7/1993
JP    H0775213 A     3/1995
(Continued)

OTHER PUBLICATIONS

International Search Report issued in Intl. Appln. No. PCT/JP2021/047109, mailed Jan. 25, 2022. English translation provided.
(Continued)

*Primary Examiner* — Daniel Kessie
*Assistant Examiner* — Brian K Baxter
(74) *Attorney, Agent, or Firm* — ROSSI, KIMMS & McDOWELL LLP

(57) ABSTRACT

Provided is a power supply system (9) that includes at least one electric motor (93) including a power transmitter (931) configured to transmit power via a contactless power supply method to a load device (95) to be supplied with power and at least one load device (95) including a power receiver (951) configured to receive the power transmitted from the power transmitter.

3 Claims, 8 Drawing Sheets

(51) Int. Cl.
*H02J 50/10* (2016.01)
*H02J 50/20* (2016.01)
*H02J 50/30* (2016.01)

(56) References Cited

U.S. PATENT DOCUMENTS

| | | | |
|---|---|---|---|
| 2015/0256115 A1* | 9/2015 | Zeng | H04B 5/79 |
| | | | 318/16 |
| 2015/0330851 A1* | 11/2015 | Beligere | G01L 3/108 |
| | | | 29/601 |
| 2016/0268844 A1* | 9/2016 | Okidan | H02J 50/12 |
| 2016/0329750 A1* | 11/2016 | Okidan | B60L 53/126 |
| 2017/0244284 A1* | 8/2017 | Takahashi | H02J 50/12 |
| 2018/0131239 A1* | 5/2018 | Stephenson | H02J 7/0042 |
| 2018/0152056 A1* | 5/2018 | Takahashi | H02P 27/06 |
| 2018/0205266 A1* | 7/2018 | Miyamoto | H02J 50/10 |
| 2020/0346778 A1* | 11/2020 | Johns | B64U 50/19 |
| 2022/0231547 A1* | 7/2022 | Wu | H02J 50/005 |

FOREIGN PATENT DOCUMENTS

| | | |
|---|---|---|
| JP | H0787712 A | 3/1995 |
| JP | 2018117511 A | 7/2018 |
| JP | 2019201477 A | 11/2019 |
| WO | 2013136627 A1 | 9/2013 |
| WO | 2019163000 A1 | 8/2019 |

OTHER PUBLICATIONS

Written Opinion issued in Intl. Appln. No. PCT/JP2021/047109, mailed Jan. 25, 2022. English translation provided.

* cited by examiner

FIG.7A

| Transmission Power | Received Power | | | | | Multiplying Factor of Transmission Power Output |
| --- | --- | --- | --- | --- | --- | --- |
| | Load 1 | Load 2 | Load 3 | Load 4 | Load 5 | |
| Transmission Power 1 | 100% | 90% | 50% | 20% | 0% | 0% | 1 |
| Transmission Power 2 | 100% | 10% | 20% | 50% | 20% | 10% | 1 |
| Transmission Power 3 | 100% | 0% | 0% | 20% | 50% | 90% | 1 |
| Total | 300% | 100% | 70% | 90% | 70% | 100% | |

FIG.7B

| Transmission Power | Received Power | | | | | Multiplying Factor of Transmission Power Output |
| --- | --- | --- | --- | --- | --- | --- |
| | Load 1 | Load 2 | Load 3 | Load 4 | Load 5 | |
| Transmission Power 1 | 120% | 108% | 60% | 24% | 0% | 0% | 1.2 |
| Transmission Power 2 | 200% | 20% | 40% | 100% | 40% | 20% | 2 |
| Transmission Power 3 | 120% | 0% | 0% | 24% | 60% | 108% | 1.2 |
| Total | 440% | 128% | 100% | 148% | 100% | 128% | |

FIG.7C

| Transmission Power | Received Power | | | | | Multiplying Factor of Transmission Power Output |
| --- | --- | --- | --- | --- | --- | --- |
| | Load 1 | Load 2 | Load 3 | Load 4 | Load 5 | |
| Transmission Power 1 | 100% | 90% | 50% | 20% | 0% | 0% | 1 |
| Transmission Power 2 | 250% | 25% | 50% | 125% | 50% | 25% | 2.5 |
| Transmission Power 3 | 100% | 0% | 0% | 20% | 50% | 90% | 1 |
| Total | 450% | 115% | 100% | 165% | 100% | 115% | |

POWER SUPPLY SYSTEM, POWER SUPPLY SYSTEM CONTROL METHOD, AND PROGRAM

TECHNICAL FIELD

The present invention relates to a power supply system, a method for controlling the power supply system, and a program.

BACKGROUND ART

In recent years, automation of manufacturing equipment has progressed, and, accordingly, techniques have been proposed to control electric motors that are the drive sources of various types of devices and simplify (eliminate) wiring in equipment. For example, a motor driving system described in Patent Document 1 is a linear motor system in which a power transmitting coil of a stator can be used as a power transmitting coil for contactless power supply or a coil for driving a rotor of the motor in a switchable manner, and the rotor of the motor is provided with a power receiving coil such that contactless power supply is possible between the stator and (a position sensor provided in) the rotor.

Also, in a motor driving system described in Patent Document 2, motor units each including integrally formed power converter are wirelessly comprehensively controlled by one host control device. This reduces the burden of wiring work, reduces the possibility of an open circuit, and reduces susceptibility to the effects of noise.

CITATION LIST

Patent Literature

Patent Document 1: WO 2019/163000
Patent Document 2: WO 2013/136627

SUMMARY OF INVENTION

Technical Problem

According to the technique in Patent Document 1 described above, the motor and the supply source (and inverter) of power to the contactless power supply structure are formed as one, and this can help simplify wiring of the motor driving system. However, with the technique in Patent Document 1, power from the power transmitting coil provided in the stator of the linear motor is supplied only to (the position sensor provided in) the rotor of the motor. Thus, the effect of this technique is limited to a portion in a motor driving system.

The present invention has been made in consideration of the above-described problem, and an object of the present invention is to provide a technique with which a motor can be used as a power transmission base in a contactless power supply system and labor involved in wiring a piece of equipment including a motor and the number of wiring can be reduced.

Solution to Problem

To realize the object described above, the present invention has the following configuration.
A power supply system includes at least one electric motor including a power transmitter configured to transmit power via a contactless power supply method to a load device to be supplied with power and at least one load device including a power receiver configured to receive the power transmitted from the power transmitter.

Note that the term "contactless power supply" is not limited to a specific power supply method. For example, a power supply method for a relatively short distance such as the electromagnetic induction method, the magnetic resonance method, or the electric field coupling method can be used, or a power supply method for a relatively long distance such as the microwave method or the laser method can be used. In other words, the "power transmitter" and the "power receiver" each have a configuration appropriate for the employed contactless power supply method. For example, if the magnetic resonance method is used, the configuration includes a resonant circuit, and if the microwave method is used, the configuration includes an antenna. In addition, the "load device" can correspond to various types of devices. Examples of the load device may include various sensors, cameras, lighting, and switches, as well as small electric motors, small solenoids, and relays.

According to this configuration, the load device to be supplied with power is wirelessly supplied with power from the electric motor. This creates an effect that the wiring for power supply to the electric motor which requires a relatively large amount of power is shared with the load device to be supplied with power. In other words, the electric motor can be used as a power transmission base for contactless power supply, and the power wiring in the equipment where the electric motor is disposed can be reduced. Also, with a reduction in the wiring, the labor involved in wiring can also be reduced and power transmission equipment can also be reduced.

Also, the power supply system may further include a controller configured to control power supply to the power transmitter and/or a direction of power transmission from the power transmitter. The at least one load device may include a wireless communication unit configured to transmit, to the controller, power reception information relating to a power reception state of whether power transmitted from the power transmitter to the power receiver included in the at least one load device satisfies power required to operate the at least one load device. The controller may control power supply to the power transmitter and/or a direction of power transmission from the power transmitter on the basis of the power reception information.

According to this configuration, whether the power required to operate the load device has been supplied via wireless power transmission can be recognized, and control can be performed to supply the power required to operate the load device. Also, when the power required to operate the load device has not been supplied, an alert to this effect may be issued by an output unit.

Also, the power supply system may include a plurality of the electric motors and a plurality of the load devices. The controller may control power supply to a plurality of the power transmitters and/or a direction of power transmission from the plurality of power transmitters such that power required to operate each of the plurality of load devices can be received by each of the plurality of load devices and a total value of power supplied to the power transmitters of all of the electric motors is minimized.

To transmit the power required to operate the load devices, processing may be performed to transmit the largest amount of power possible (taking into account restrictions in the power supply method). However, from the perspective of efficiency, it is desirable to transmit only enough power to operate the load devices and not waste power. In a case in which power is supplied from the power transmitters of the electric motors to the load devices via a wireless method, control is performed to supply only the power required to operate the load devices. Here, a number of patterns may be considered to determine by how much to increase the power supply to the power transmitter (or how to change the position or orientation of the power transmitter) of which electric motor. In this regard, with the configuration described above, the power required to operate the load devices can be supplied via the most efficient control method and without waste.

Another aspect of the present invention for realizing the object described above is a method for controlling a power supply system including an electric motor including a power transmitter configured to transmit power via a contactless power supply method to a load device to be supplied with power, a controller configured to control power supply to the power transmitter and/or a direction of power transmission from the power transmitter, and a plurality of load devices each including a power receiver configured to receive power transmitted from the power transmitter and a wireless communication unit configured to transmit, to the controller, power reception information relating to a power reception state of power transmitted from the power transmitter to the power receiver, the method including: a power reception state checking step of performing, individually and sequentially for all of the electric motors, a sequence for transmitting power from the power transmitter of the electric motor and transmitting power reception information relating to the power transmitted to all of the load devices to the controller; and a control step of controlling, on the basis of information obtained in the power reception state checking step, power supply to all of the power transmitters and/or a direction of power transmission from the power transmitter such that a total value of power received from all of the electric motors by all of the load devices is equal to or greater than a value required to operate the load devices and a total value of power supplied to the power transmitters of all of the electric motors is minimized.

According to this method, information relating to the actual power supply state between the electric motors and the load devices determined on the basis of the distance or positional relationship between a transmitter and a receiver and the obstacle relationship between the transmitter and the receiver can be obtained, and, on the basis of this information, transmission power for the electric motors can be controlled via the most efficient method and without waste.

Another aspect of the present invention is a program for causing a computer to execute the method described above and a computer-readable storage medium that stores the program in a non-transitory manner.

The configurations and processing described above can be combined to configure the present invention as long as no technical contradiction arises.

Advantageous Effects of Invention

According to the present invention, provided is a technique with which a motor can be used as a power transmission base in a contactless power supply system and labor involved in wiring a piece of equipment including a motor and the number of wires can be reduced.

BRIEF DESCRIPTION OF DRAWINGS

FIG. 7A is a first table showing information of the transmission power adjustment processing according to Example 1 of the present invention. FIG. 7B is a second table showing information of the transmission power adjustment processing according to Example 1 of the present invention. FIG. 7C is a third table showing information of the transmission power adjustment processing according to Example 1 of the present invention.

DESCRIPTION OF EMBODIMENTS

Application Example

Figure 1:
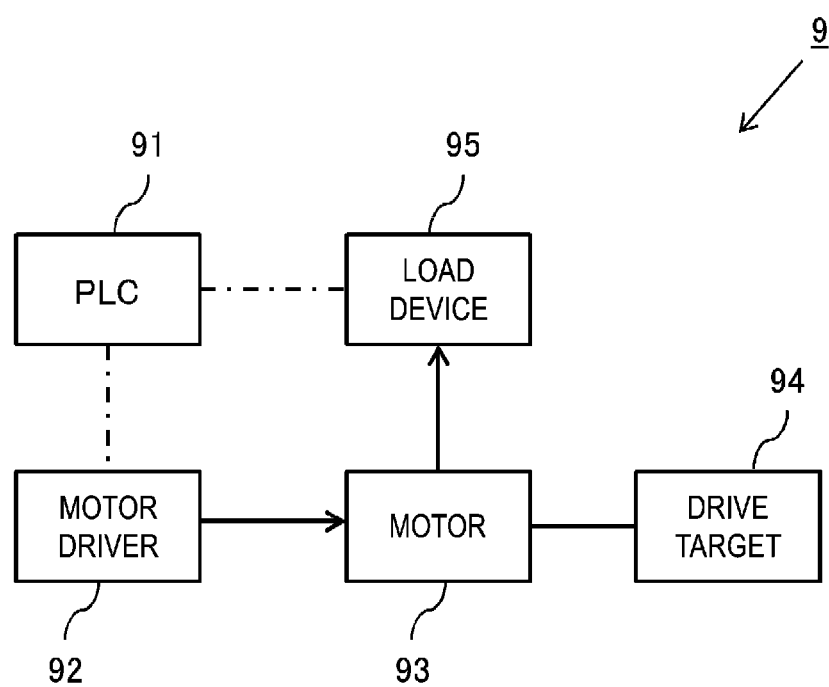
FIG. 1 is a block diagram illustrating a schematic configuration of a power supply system according to an Application Example of the present invention.
Figure 2:
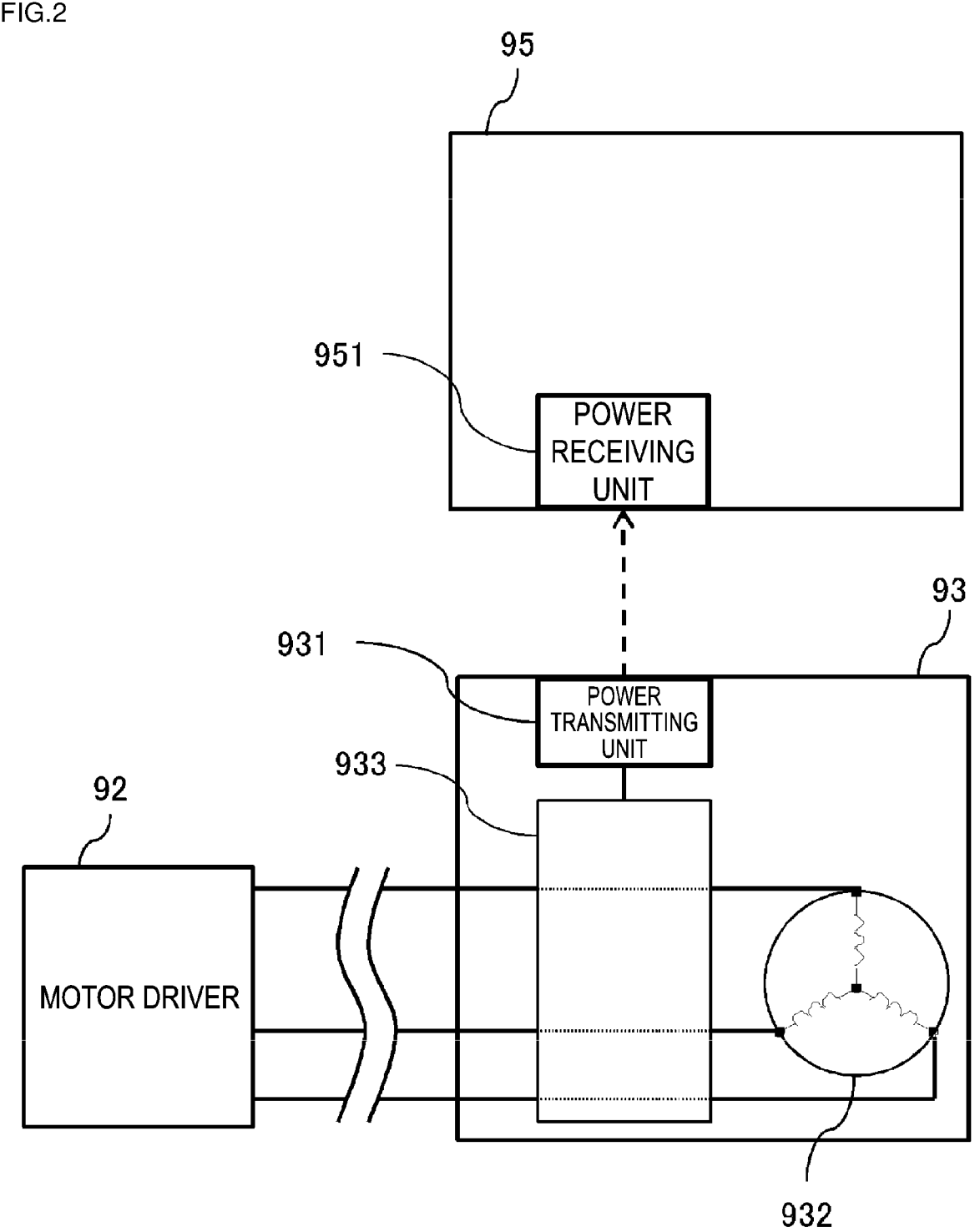
FIG. 2 is a schematic view illustrating a motor according to an Application Example of the present invention.

An application example of the present disclosure will be described below with reference to FIGS. 1 and 2. As illustrated in FIG. 1, a power supply system 9 according to the present disclosure includes a motor 93 that drives a drive target 94, a motor driver 92 that supplies power to the motor 93 and controls the motor 93, a programmable logic controller (PLC) 91 that issues control commands for the motor 93 to the motor driver 92, and a load device 95 that is supplied with power from a contactless power transmitter (described below) of the motor 93.

The movement of the drive target 94 is controlled by the motor driver 92 controlling the motor 93 on the basis of control commands from the PLC 91. Although not illustrated, the motor 93 includes an encoder that senses the state of the motor 93 and transmits feedback to the motor driver 92. In other words, the motor 93 according to the present Application Example is a so-called servo motor, and the power supply system 9 according to the present Application Example includes a servo system.

Also, the motor 93 according to the present Application Example includes a structure for transmitting power to the load device 95 via a contactless power supply method. FIG. 2 is an explanatory diagram illustrating this structure. FIG. 2 illustrates a simplified model of an electric circuit of the motor 93 and the load device 95. As illustrated in FIG. 2, the motor 93 according to the present Application Example includes a drive coil 932 for driving the drive target 94 (in other words, for converting power into motion of the rotor), a power transmitting unit 931 for transmitting power to the load device 95 via a contactless power supply method, and a power extraction unit 933 for extracting power for power transmission from the power transmitting unit 931. Note that the configuration of the power extraction unit 933 is not particularly limited, and the power extraction unit 933 may be configured by a path for supplying power from the motor driver 92 directly to the power transmitting unit 931, and a portion of the path may be shared with the drive coil 932.

Figure 3:
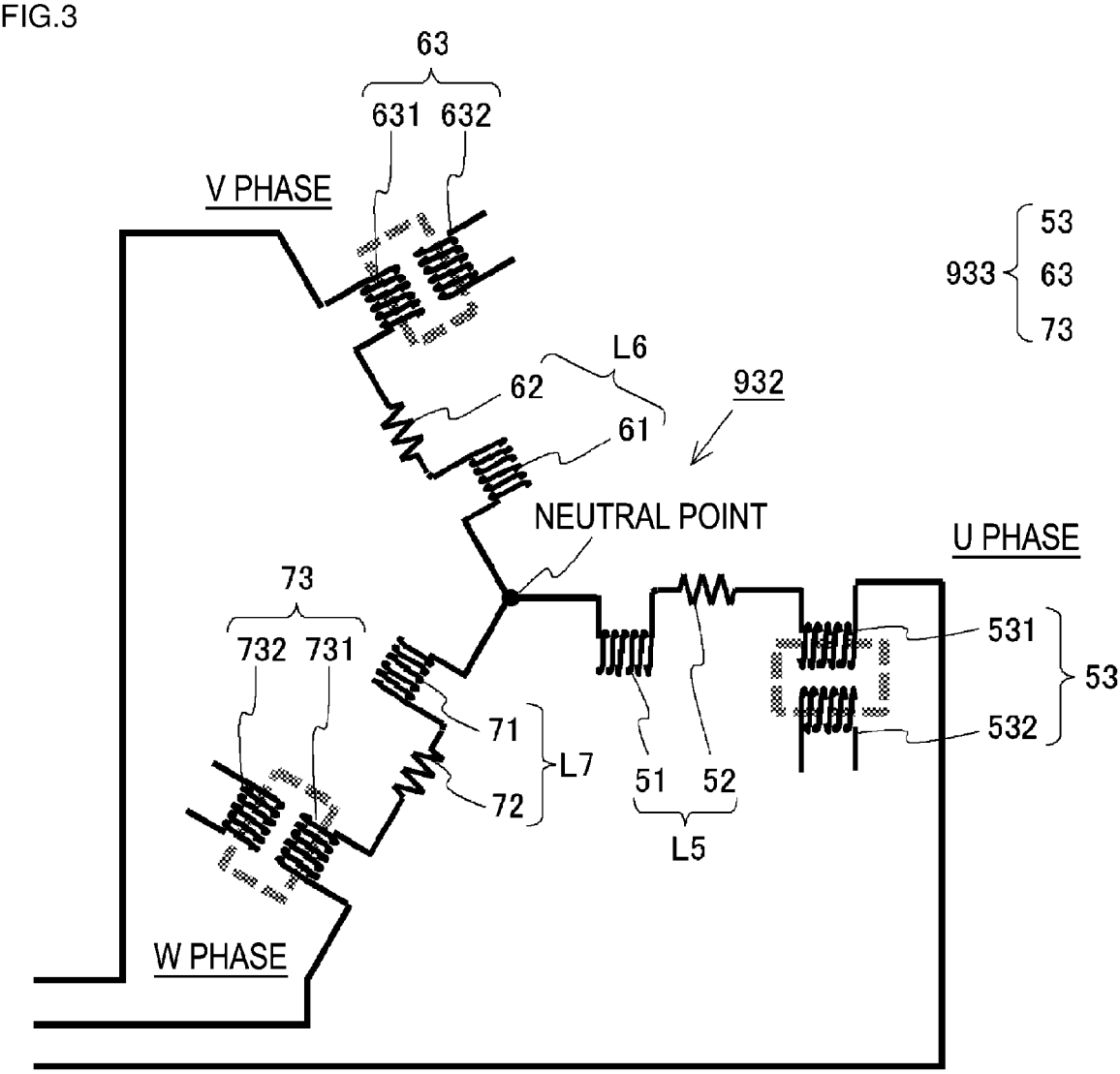
FIG. 3 is a diagram illustrating an example of a schematic configuration of a power extraction unit according to the present invention.

A specific mode of the power extraction unit 933 that extracts power from the drive coil 932, which is a coil unit of the motor 93, will now be described with reference to FIG. 3. The coil unit 932 includes three phases-coil portions L5, L6, and L7 of a U phase, a V phase, and a W phase, respectively. The coil portions of the phases are connected in a Y connection, and the section where the coil portions are connected corresponds to a neutral point. In FIG. 3, for the U-phase coil portion L5, the inductance component is denoted by 51, and the resistance component is denoted by 52. In a similar manner, for the V-phase coil portion L6, the inductance component is denoted by 61 and the resistance component is denoted by 62, and for the W-phase coil portion L7, the inductance component is denoted by 71 and the resistance component is denoted by 72.

Transformer structures 53, 63, and 73 that form the power extraction unit 933 are arranged for each phase. Specifically, for the U phase, a primary coil 531 of the U-phase transformer structure 53 is connected in series with the coil portion L5, for the V phase, a primary coil 631 of the V-phase transformer structure 63 is connected in series with the coil portion L6, and for the W phase, a primary coil 731 of the W-phase transformer structure 73 is connected in series with the coil portion L7. Further, a secondary coil 532 of the U-phase transformer structure 53, a secondary coil 632 of the V-phase transformer structure 63, and a secondary coil 732 of the W-phase transformer structure 73 are connected to the power transmitting unit 931.

Note that the turns ratio (ratio of the number of turns in the secondary coil to the number of turns in the primary coil) is basically the same for the transformer structures of all the phases, but may be different. Also, in the mode illustrated in FIG. 3, the transformer structures are arranged for all three phases, with the secondary coils being connected to the power transmitting unit 931. However, a transformer structure may be arranged for only one or more of the three phases, with the secondary coil being connected to the power transmitting unit 931.

By using the drive coil 932 and the transformer structures 53, 63, and 73 with such a configuration, some of the power supplied from the motor driver 92 to the motor 93 can be extracted by the power extraction unit 933. According to this configuration, when the motor 93 is running, power is constantly being stably supplied to the load device 95, and thus cables wired to the load device 95 are not necessary. This allows the cable wiring work to be greatly reduced and the cost to be reduced.

Also, the load device 95 includes a power receiving unit 951 that receives power via a contactless power supply method. In this example, the load device 95 corresponds to a sensor, for example, but is not limited to a sensor. Power can be supplied to a discretionary device compatible with the power supply method.

Alternating current power is supplied from the motor driver 92 to the power transmitting unit 931 and the drive coil 932. When power is supplied to the drive coil 932, the rotor (not illustrated) rotates and the drive target 94 is driven in a similar manner to a typical rotary motor. Also, the power extracted from the power extraction unit 933 and supplied to the power transmitting unit 931 is transmitted to the power receiving unit 951 of the load device 95 via a desired contactless power supply method (e.g., the electromagnetic induction method), generating a current in the power receiving unit 951. The current generated in the power receiving unit 951 is converted into direct current by a rectifier circuit (not illustrated) inside the load device 95, and by the converted direct current, power for operating the load device 95 is generated.

Also, the load device 95 includes a transmitter (not illustrated) for transmitting, to the PLC 91, information relating to the state of the power received from the power transmitting unit 931 (e.g., what percentage of the power required to operate the load device 95 has been received). On the basis of the information relating to the power reception state, the PLC 91 transmits, to the motor driver 92, a command to control the supply of power (current) to the power transmitting unit 931 so that only the power required to operate the load device 95 is received by the load device 95. Note that a command may be directly transmitted from the PLC 91 to the power transmitting unit 931 via wireless communication.

With the power supply system according to the present Application Example described above, the motor 93 can be used as a power transmission base for contactless power supply, and the power wiring in a piece of equipment where the motor 93 is disposed can be reduced.

Example 1

An example of the present invention will be described in detail below with reference to the drawings.

Figure 4:
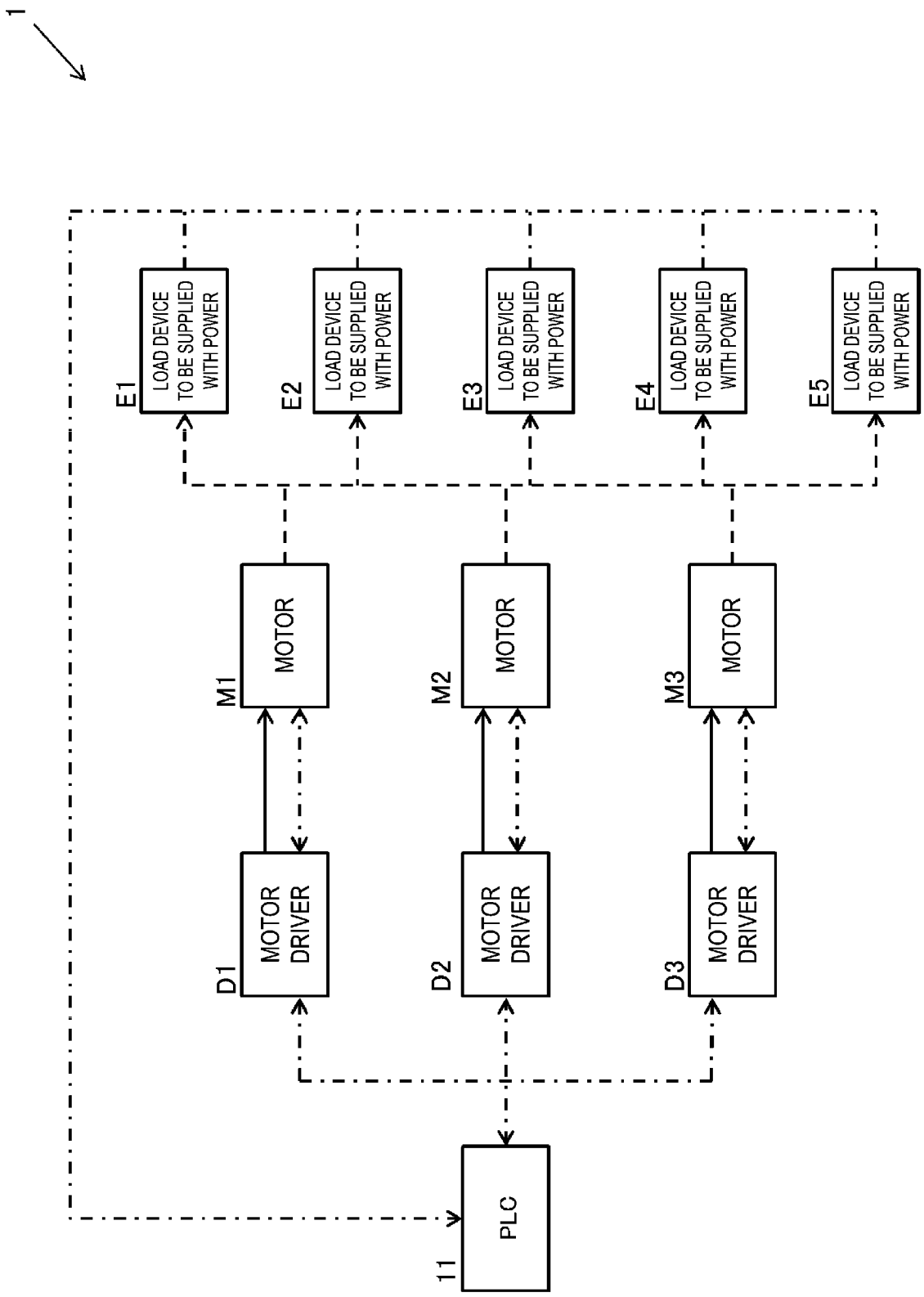
FIG. 4 is a block diagram illustrating a schematic configuration of a power supply system according to Example 1 of the present invention.
Figure 5:
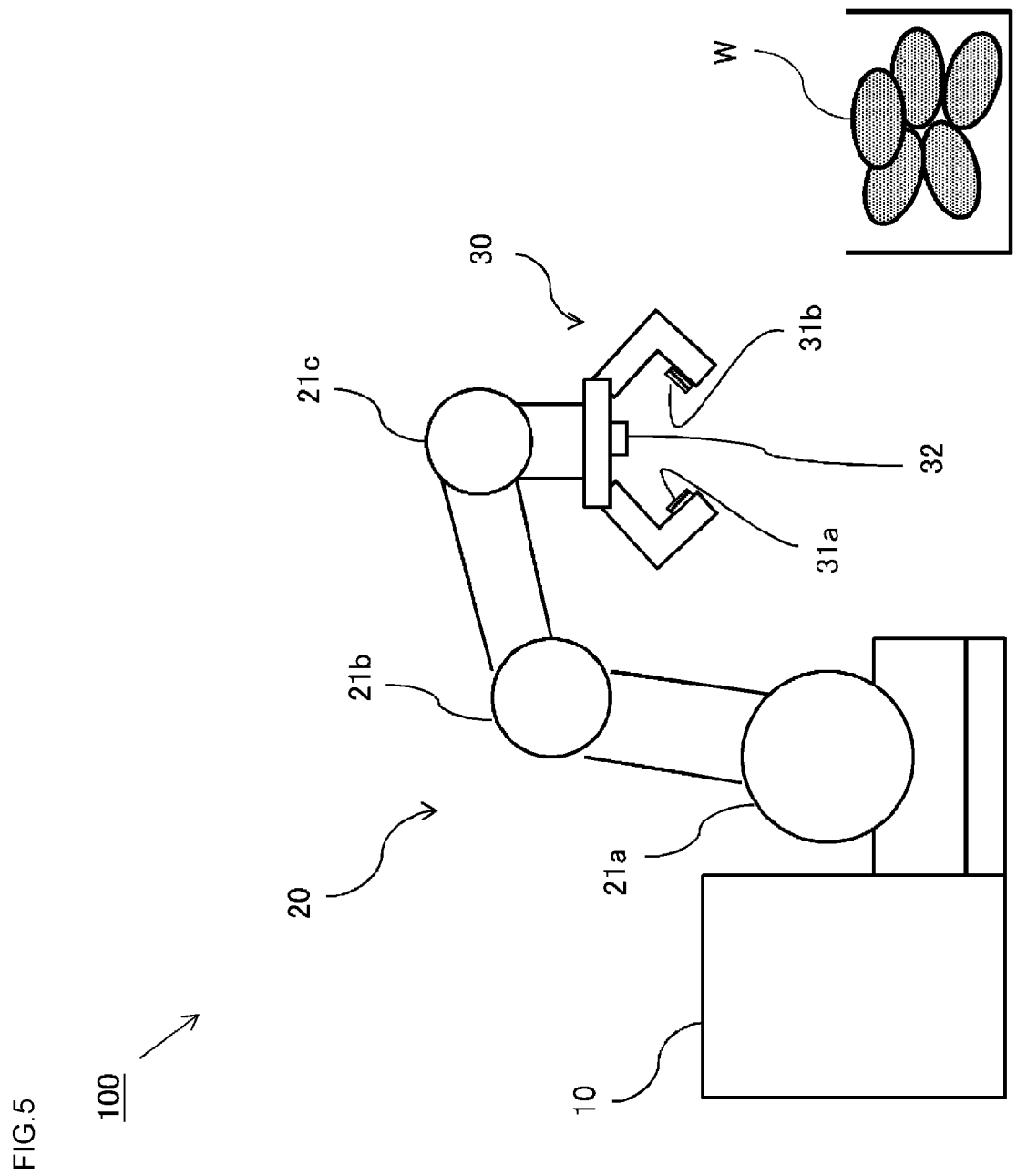
FIG. 5 is a schematic view illustrating the appearance of a robot arm according to Example 1 of the present invention.

FIG. 4 is a block diagram illustrating a schematic configuration of a power supply system 1 according to the present example. FIG. 5 is a schematic view illustrating the appearance of a robot arm 100, which is an example of a device to which the power supply system 1 according to the present example can be applied.

(System Configuration)

As illustrated in FIG. 4, the power supply system 1 according to the present example includes a plurality of motors M1, M2, and M3, motor drivers D1, D2, and D3 that supply power to the motors M1, M2, and M3 and control the motors M1, M2, and M3, a PLC 11 that issues commands relating to control of the motors M1, M2, and M3 to the motor drivers D1, D2, and D3, and a plurality of load devices E1, E2, E3, E4, and E5 that are supplied with power from contactless power transmitter included in the motors M1, M2, and M3. Note that solid line arrows in FIG. 4 indicate the transmission of power via wired communication, dashed line arrows indicate the transmission of power via wireless communication, and dot-dash line arrows indicate the transmission and reception of information (signals) via wired or wireless communication.

Though not illustrated, a device (or member) serving as a drive target is connected to each motor M1, M2, M3. Each motor M1, M2, M3 includes a drive coil (not illustrated) for driving the drive target and a power transmitter (not illustrated) for transmitting power to at least one of the load devices E1, E2, E3, E4, and E5 via a contactless power supply method. The configuration of each of the motors M1, M2, and M3 may be similar or different to that described in the Application Example (e.g., a resonant coil may be provided and a magnetic resonance method may be used as the contactless power supply method).

Each of the load devices E1, E2, E3, E4, and E5 include a transmitter (not illustrated) for transmitting, to the PLC 11, information relating to the reception state of the power transmitted from the motors M1, M2, and M3. The PLC 11 transmits, to the motor drivers D1, D2, and D3, commands to control the power supply to the transmitter of the motors M1, M2, and M3 on the basis of the power reception states of the load devices E1, E2, E3, E4, and E5. The specific flow of transmission power adjustment processing will be described later.

System Embodiment

The robot arm 100 illustrated in FIG. 5 is an example of a piece of equipment to which the power supply system 1 according to the present example is applied. As illustrated in FIG. 5, the robot arm 100 includes a manipulator portion 30, an arm portion 20, and a control unit 10 as main components.

The manipulator portion 30 is configured to be openable and closable via a plurality of actuators (not illustrated) and grips a workpiece W, which is a gripping target, by transitioning from an open state to a closed state. Further, the manipulator portion 30 is provided with a camera 32, and an image of the workpiece W is captured by the camera 32. The control unit 10 performs image processing on the captured image to identify the position and shape of the workpiece W and controls the arm portion 20 and the manipulator portion 30.

Also, pressure sensor modules 31a, 31b, . . . including an array of pressure sensors are disposed on the side of the manipulator portion 30 where the workpiece W is gripped. The gripping force at the manipulator portion 30 is measured by applying a direct current voltage to the pressure sensors constituting the pressure sensor modules 31a, 31b, . . . , and calculating the pressure on the basis of resistance values determined in response to the load applied to the pressure sensors.

The arm portion 20 includes a plurality of movable portions 21a, 21b, and 21c, and the movable portions are configured to be rotatable via actuators such as servo motors. Thus, the manipulator portion 30 can be moved within a predetermined operating range. Also, the actuators constituting the movable portions 21a, 21b, and 21c include power transmitter for supplying power via a contactless power supply method, as will be described below.

The control unit 10 includes a motor driver and a PLC. The control unit 10 performs input and output of various types of information and performs arithmetic processing, and controls the entire robot arm 100 by controlling the actuators and the like. The control unit 10 may further include a general-purpose computer system including a CPU (processor), a main storage device (memory), an auxiliary storage device (a hard disk, etc.), an input device (a keyboard, a mouse, a controller, a touch panel, etc.), and an output device (a liquid crystal display, a speaker, etc.).

The control unit 10, according to a predetermined program or in response to receiving input from a user, controls the manipulator portion 30 and the arm portion 20 to grip, move, and release the workpiece W within the operating range.

Also, in the robot arm 100 according to the present example, the plurality of movable portions 21a, 21b, and 21c of the arm portion 20 and the actuators of the manipulator portion 30 are supplied with power from the control unit 10 via wired communication. However, the pressure sensor modules 31a, 31b, . . . and the camera 32 are supplied with power from the movable portions 21a, 21b, and 21c via a contactless power supply method.

That is, in the robot arm 100, the actuators of the movable portions 21a, 21b, and 21c correspond to the motors M1, M2, and M3 of the power supply system 1, the control unit 10 corresponds to the PLC 11 and the motor drivers D1, D2, and D3, and the pressure sensor modules 31a, 31b, . . . , the camera 32, and the like correspond to the load devices E1, E2, E3, E4, and E5.

(Processing of Adjusting Transmission Power from Motors)

Figure 6:
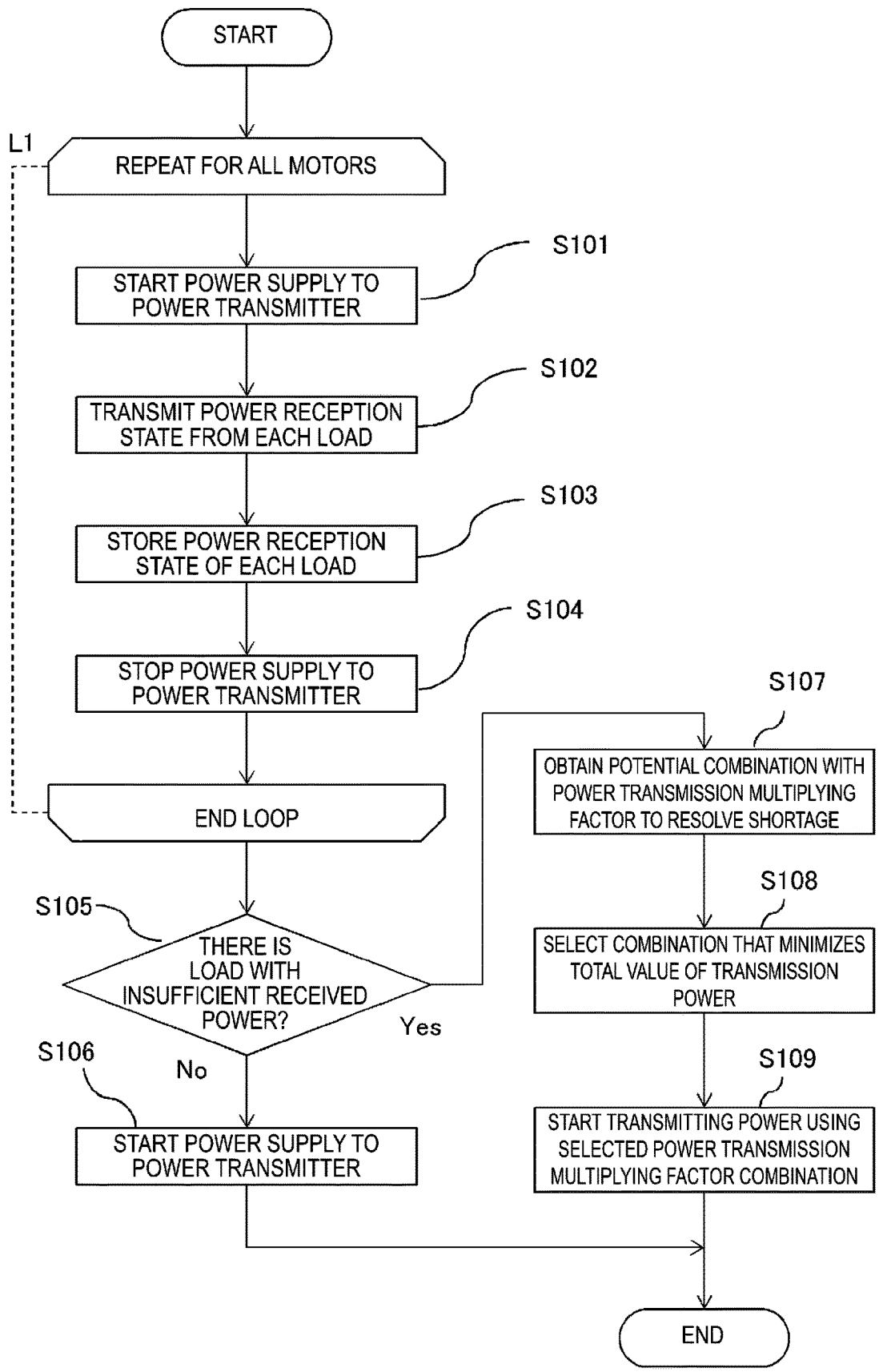
FIG. 6 is a flowchart illustrating the flow of transmission power adjustment processing performed upon startup of the power supply system according to Example 1 of the present invention.

Next, the flow of transmission power adjustment processing performed by the power supply system 1 according to the present example will be described. FIG. 6 is a flowchart illustrating the flow of the transmission power adjustment processing performed when the devices associated with the power supply system 1 are started up.

As illustrated in FIG. 6, when the devices associated with the power supply system 1 are started up, first, the processing of a loop L1 described below is repeatedly performed for each motor M1, M2, M3. In the loop L1, first, power is supplied from one of the motor drivers D1, D2, and D3 to the power transmitter of one corresponding motor on the basis of a command from the PLC 11. In response to this, power supply to the load devices E1, E2, E3, E4, and E5 via a contactless power supply method is started (S101). Next, information relating to what percentage of the power (hereinafter, also referred to as required operation power) required to operate the load device has been received is wirelessly transmitted from the load devices E1, E2, E3, E4, and E5 to the PLC 11 (S102). Then, the PLC 11 stores the transmitted information (S103) and instructs the corresponding motor driver to stop power supply to the power transmitter of the motor (S104). When power supply from one motor to each load device is stopped in this manner, the processing of the one loop L1 ends.

After the series of processing of the loop L1 has been performed for all of the motors, the PLC 11 references the data obtained in step S103 of each loop and judges whether there is a load device of the load devices E1, E2, E3, E4, and E5 in the system for which the total amount of received power from the motors M1, M2, and M3 does not satisfy the required operation power (S105). Here, in a case in which a judgment is made that there are no load device for which the total amount of received power from the motors M1, M2, and M3 does not satisfy the required operation power, power supply to the power transmitters of all of the motors similar to the power supply in step S101 of the loop L1 is started (S106), and the series of processing ends.

On the other hand, in step S105, in a case in which a judgment is made that there is a load device for which the total amount of received power from the motors M1, M2, and M3 does not satisfy the required operation power, processing is performed to increase the power output of the power transmitters of the motors M1, M2, and M3 such that power required for operating the load device is supplied to all of the load devices.

Specifically, to achieve a state where the received power of each load device is the required operation power or greater, processing is performed to obtain potential combinations of what percentage to increase the power transmission output of the power transmitters of the motors M1, M2, and M3, where the power output in a case of the power transmission in step S101 of the loop L1 is defined as 100% (S107). Then, from among the obtained potential combinations, the combination with the minimum total amount of power transmitted from the power transmitters of the motors M1, M2, and M3 is selected (S108). Hereinafter, the processing of step S107 and step S108 will be described with reference to FIG. 7.

The tables in FIGS. 7A, 7B, and 7C show the relationship between the power transmitted from the power transmitters of the motors M1, M2, and M3 and the power received by the load devices E1, E2, E3, E4, and E5. Transmission Power 1 in the "Transmission Power" column represents the power transmitted from the power transmitter of the motor M1. The transmission power is listed as a percentage where the power output after the power transmission in step S101 of the loop L1 is defined as 100%. In a similar manner, Transmission Power 2 represents the power transmitted from the power transmitter of the motor M2, and Transmission Power 3 represents the power transmitted from the power transmitter of the motor M3.

Also, Load 1 in the "Received Power" column represents the power received by the power receiver of the load device E1. The received power is listed as a percentage, where the power required to operate the load device is defined as 100%. In a similar manner, Load 2 represents the power received by the load device E2, Load 3 represents the power received by the load device E3, Load 4 represents the power received by the load device E4, and Load 5 represents the power received by the load device E5.

The table in FIG. 7A shows the received power at each of the load devices E1, E2, E3, E4, and E5 when power is transmitted from the power transmitters of the motors M1, M2, and M3 in step S101 of the loop L1. According to the table, it can be seen that the power received by the load devices E2, E3, and E4 is less than the required operation power. In other words, in a case in which the judgment in step S105 is made on the basis of the state shown in the table in FIG. 7A, the processing proceeds to step S107.

On the other hand, the tables in FIGS. 7B and 7C show a state in which the transmission power of the motors M1, M2, and M3 has been increased by a multiplying factor from the state of FIG. 7A such that power sufficient to satisfy the required operation power can be received by each of the load devices E1, E2, E3, E4, and E5. In other words, FIGS. 7B and 7C show examples of the potential combinations obtained in step S107.

In the table in FIG. 7B, the transmission power from all of the power transmitters is increased by 1.2 times for the Transmission Power 1, by 2 times for the Transmission Power 2, and by 1.2 times for the Transmission Power 3. On the other hand, in the table in FIG. 7C, only the Transmission Power 2 is increased to 2.5 times, and the Transmission Power 1 and the Transmission Power 3 are not increased.

Here, comparing the tables in FIGS. 7B and 7C, both combinations make it possible for power sufficient to satisfy the required operation power to be received by all of the load devices E1, E2, E3, E4, and E5. However, the "Total" field for the transmission power in FIG. 7B is 440%, compared to 450% for the "Total" field for the transmission power in FIG. 7C. That is, the total amount of power transmitted from the power transmitters of the motors M1, M2, and M3 is less in FIG. 7B than in FIG. 7C. For example, in a case in which the potential combinations obtained in step S107 are the two patterns of the combination indicated in FIG. 7B and the combination indicated in FIG. 7C, in step S108, the combination of FIG. 7B is selected.

Once the combination with the minimum total amount of power transmitted from the power transmitters of the motors M1, M2, and M3 is selected in this manner in step S108, the PLC 11 issues a command to the motor drivers D1, D2, and D3 to start supplying power to the power transmitters of the motors M1, M2, and M3 at the multiplying factor of the combination (S109), and then the series of processing ends.

Note that after system start up (that is, after power supply has started), the power reception states of the load devices E1, E2, E3, E4, and E5 continue to be monitored. In a case in which the received power no longer satisfies the required operation power, an alert to that effect is issued.

With the power supply system 1 according to the present example described above, the plurality of motors can be used as a power transmission base for contactless power supply, and the plurality of load devices in the device where the motors are disposed can be wirelessly supplied with power. Also, the transmission power can be adjusted such that power sufficient for operating all of the plurality of load devices can be transmitted via a contactless power supply method and the power transmitted from the power transmitter is minimized. This facilitates efficient system operation.

Modified Example

Figure 8:
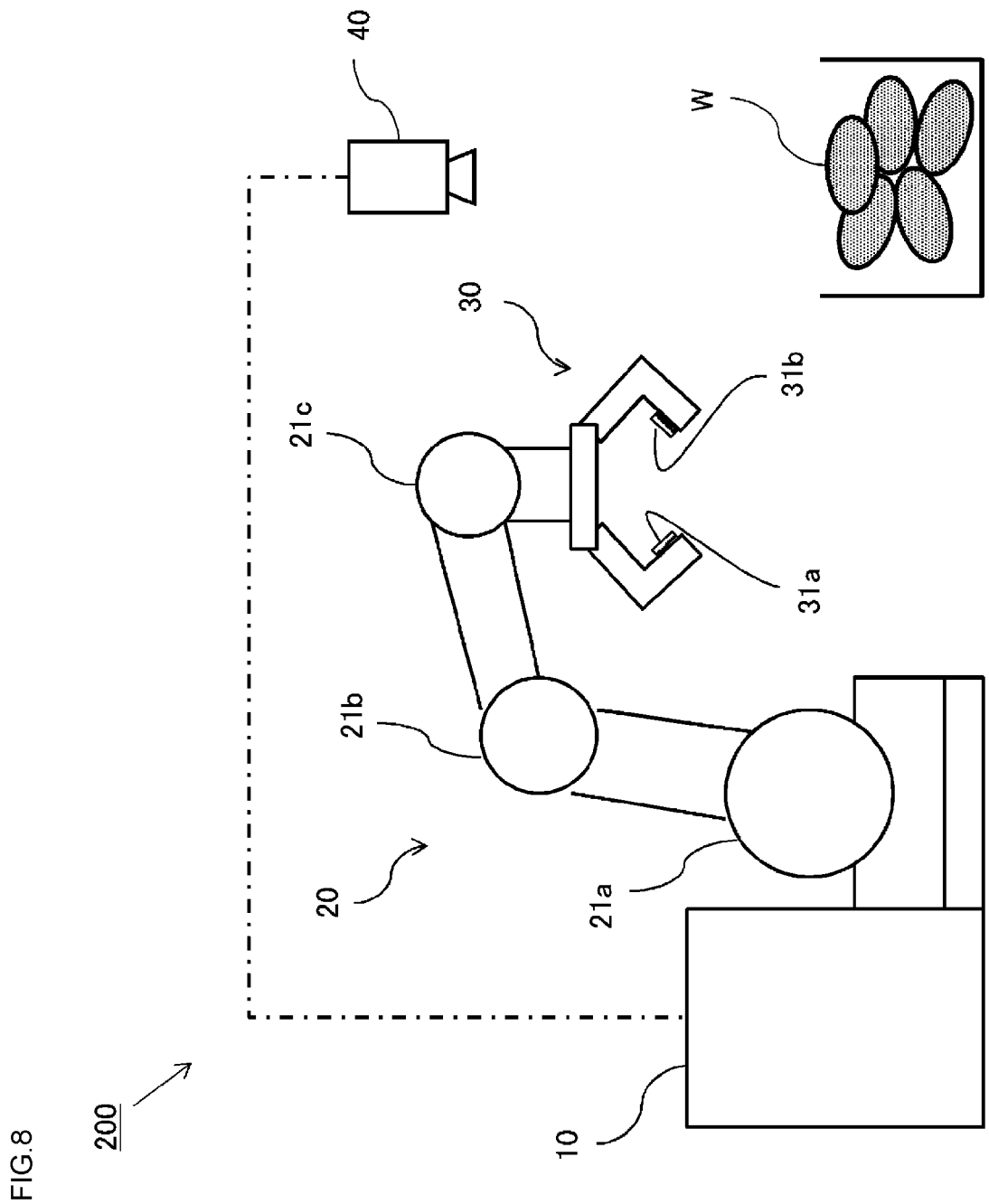
FIG. 8 is a schematic view illustrating the appearance of a robot arm according to a modified example of the present invention.

Next, a modified example of the power supply system according to Example 1 will be described. FIG. 8 is a diagram illustrating a robot arm 200 according to the modified example of Example 1. The robot arm 200 according to the present modified example has substantially the same configuration to that of the robot arm 100 according to Example 1. Thus, configurations similar to those in the robot arm 100 according to Example 1 are given the same reference signs and are not described herein.

As illustrated in FIG. 8, the present modified example is different from Example 1 in that a camera 40 (corresponding to the load device) is configured as a separate member from the robot arm 200 and a microwave method is used as the contactless power supply method. In other words, a power transmitter (not illustrated) includes an antenna for transmitting microwaves, and a power receiver includes an antenna for receiving microwaves. Also, the microwaves used in power transmission are transmitted with directionality, and the control unit 10 controls the transmission direction.

Also, according to the present modified example, in the transmission power adjustment processing executed upon system start up, when adjusting the power received by the load devices E1, E2, E3, E4, and E5, the power received by each load device E1, E2, E3, E4, E5 can be adjusted to the required operation power by the control unit 10 controlling the transmission direction of the microwaves.

<Others>

The examples described above are merely illustrative of the present invention, and the present invention is not limited to the specific modes described above. Various modifications and combinations are possible within the scope of the technical idea of the present invention. For example, in the examples described above, a robot arm is an embodiment of the power supply system. However, the disclosure can be applied to any device including a motor, such as various types of robots and conveying devices.

Also, in the examples described above, the system configuration includes three motor drivers, three motors, and five load devices, but no limitation is intended. Power and signals may be transmitted from one motor driver to all motors. Furthermore, the power supply system may include a part of a power transmitter separate from the motor.

<Supplement 1>

A power supply system (9) includes at least one electric motor (93) including a power transmitter (931) configured to transmit power via a contactless power supply method to a load device (95) to be supplied with power; and at least one load device (95) including a power receiver (951) configured to receive the power transmitted from the power transmitter.

<Supplement 2>

A method for controlling a power supply system (1) including an electric motor (M1, M2, M3) including a power transmitter configured to transmit power via a contactless power supply method to a load device to be supplied with power, a controller (11) configured to control power supply to the power transmitter and/or a direction of power transmission from the power transmitter, and a plurality of load devices (E1, E2, E3, E4, and E5) each including a power receiver configured to receive power transmitted from the power transmitter and a wireless communication unit configured to transmit, to the controller, power reception information relating to a power reception state of power transmitted from the power transmitter to the power receiver, the method including:

a power reception state checking step (L1) of performing, individually and sequentially for all of the electric motors, a sequence for transmitting power from the power transmitter of the electric motor and transmitting the power reception information relating to the power transmitted to all of the load devices to the controller, and a control step (S107, S108, S109) of controlling, on the basis of information obtained in the power reception state checking step, power supply to all of the power transmitters and/or a direction of power transmission from the power transmitter such that a total value of power received from all of the electric motors by all of the load devices is equal to or greater than a value required to operate the load devices and a total value of power supplied to the power transmitters of all of the electric motors is minimized.

REFERENCE SIGNS LIST 1,9 power supply system
11,91 PLC
92,D1,D2,D3 motor driver
93,M1,M2,M3 motor
931 power transmitting unit
932 drive coil
933 power extraction unit
94 drive target
95,E1,E2,E3,E4,E5 load device
951 power receiving unit
100,200 robot arm
10 control unit
20 arm portion
21a,21b,21c movable portion
30 manipulator portion
31a,31b pressure sensor module
32,40 camera
W workpiece

The invention claimed is:

1. A power supply system, comprising:
a plurality of electric motors including a plurality of power transmitters, respectively, the plurality of power transmitters being configured to transmit a power via a contactless power supply method;
a plurality of load devices including a plurality of power receivers, respectively, the plurality of power receivers being configured to receive the power transmitted from the plurality of power transmitters; and
a controller configured to control a power supplied to the plurality of power transmitters and/or a direction of power transmission from the plurality of power transmitters, wherein the plurality of load devices further include a plurality of wireless communication units, respectively, the plurality of wireless communication units being configured to respectively transmit, to the controller, power reception information of the plurality of load devices, the power reception information relating to a power reception state of whether the power transmitted from the plurality of power transmitters to the plurality of power receivers included in the plurality of load devices satisfies a power required to operate each load device of the plurality of load devices, wherein the controller controls the power supplied to the plurality of power transmitters and/or the direction of power transmission from the plurality of power transmitters on a basis of the power reception information of the plurality of load devices, and wherein the controller controls the power supplied to the plurality of the power transmitters and/or the direction of power transmission from the plurality of power transmitters such that the power required to operate each load device of the plurality of load devices is respectively received by each load device of the plurality of load devices and a total value of the power supplied to the plurality of power transmitters of all of the plurality of electric motors is minimized.

2. A method for controlling a power supply system including a plurality of electric motors respectively including a plurality of power transmitters configured to transmit a power via a contactless power supply method, a controller configured to control a power supplied to the plurality of power transmitters and/or a direction of power transmission from the plurality of power transmitters, and a plurality of load devices respectively including (i) a plurality of power receivers configured to receive the power transmitted from the plurality of power transmitters and (ii) a plurality of wireless communication units configured to respectively transmit, to the controller, power reception information of the plurality of load devices, the power reception information relating to a power reception state of the power transmitted from the plurality of power transmitters to the plurality of power receivers, the method comprising:

a power reception state checking step of performing, individually and sequentially for all of the plurality of electric motors, a sequence for transmitting power from each power transmitter of the plurality of electric motors and transmitting the power reception information relating to the power transmitted to all of the plurality of load devices to the controller; and a control step of controlling, on a basis of the power reception information obtained in the power reception state checking step, the power supplied to all of the plurality of power transmitters and/or the direction of power transmission from the plurality of power transmitters such that a total value of the power received from all of the plurality of electric motors by all of the plurality of load devices is equal to or greater than a value required to operate the plurality of load devices and a total value of the power supplied to the plurality of power transmitters of all of the plurality of electric motors is minimized.

3. A non-transitory computer readable medium storing a program for causing a computer to execute the steps of the method according to claim 2.

* * * * *